US008689122B2

(12) United States Patent
Auer et al.

(10) Patent No.: US 8,689,122 B2
(45) Date of Patent: Apr. 1, 2014

(54) COMPUTERIZED METHOD AND APPARATUS FOR PROCESSING DIGITAL INFORMATION FOR DISPLAY THEREOF

(75) Inventors: Sonja Auer, Munich (DE); Christoph Kellermann, Munich (DE); Axel Platz, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1845 days.

(21) Appl. No.: 11/858,970

(22) Filed: Sep. 21, 2007

(65) Prior Publication Data

US 2008/0077876 A1 Mar. 27, 2008

(30) Foreign Application Priority Data

Sep. 22, 2006 (DE) .......................... 10 2006 044 865

(51) Int. Cl.
*G06F 3/14* (2006.01)

(52) U.S. Cl.
USPC ........... 715/767; 715/764; 705/330; 705/401; 725/39; 345/854

(58) Field of Classification Search
USPC .................. 715/200–277, 764; 700/701–799, 700/800–866; 709/201–229; 705/50–79, 705/330, 401; 345/30–111, 854; 725/39
See application file for complete search history.

(56) References Cited

U.S. PATENT DOCUMENTS

| 7,197,465 | B1* | 3/2007 | Hu et al. ....................... 705/330 |
| 7,664,651 | B1* | 2/2010 | Bennett et al. ................ 705/401 |
| 2001/0030667 | A1* | 10/2001 | Kelts .............................. 345/854 |
| 2002/0112237 | A1* | 8/2002 | Kelts .............................. 725/39 |
| 2006/0010013 | A1 | 1/2006 | Yamatake |
| 2006/0020398 | A1 | 1/2006 | Vernon et al. |
| 2007/0250784 | A1* | 10/2007 | Riley et al. .................... 715/764 |

\* cited by examiner

*Primary Examiner* — Ruay Ho
(74) *Attorney, Agent, or Firm* — Schiff Hardin LLP

(57) ABSTRACT

In a computerized method and apparatus for processing digital information for display on a display unit, digital information representing a number of items of first superordinate information and a number of items of second detailed information, respectively associated with an item of superordinate information, are read from a memory. These items of first and second information are processed such that the first information can be displayed in a first display region the display unit and the second information can simultaneously be displayed in a second display region of the display unit, with a display of the information in one of the display regions causing no modification of the size of the other display region. The first and the second display regions interact such that the associated second information regarding a number of items of information displayed in the first display region can be displayed in the second display region.

17 Claims, 4 Drawing Sheets

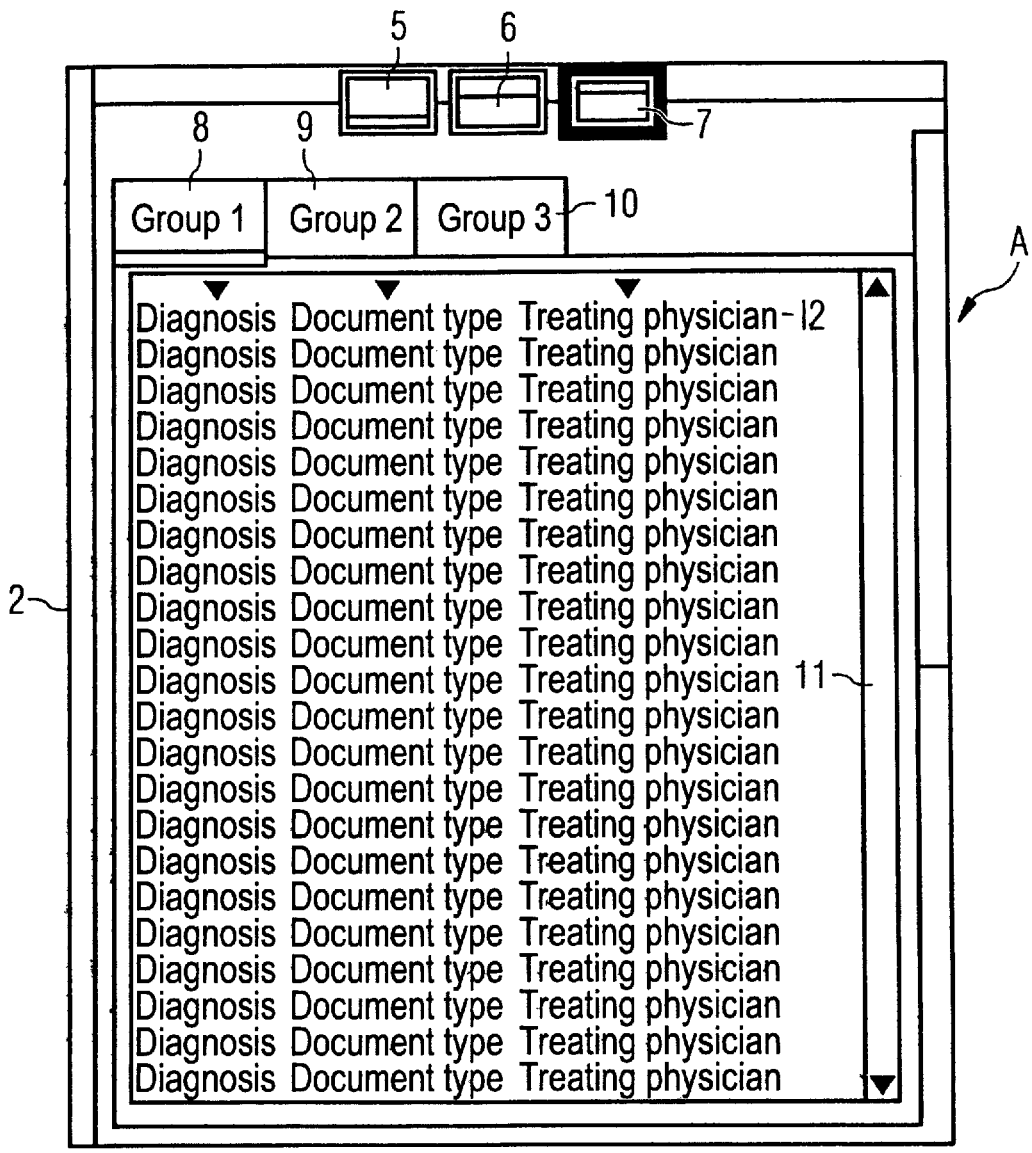

COMPUTERIZED METHOD AND APPARATUS FOR PROCESSING DIGITAL INFORMATION FOR DISPLAY THEREOF

BACKGROUND OF THE INVENTION

1. Field of the Invention

The present invention concerns a method for computerized processing of digitized information for display on a display means and a corresponding apparatus.

2. Description of the Prior Art

Many concepts exist today for the design of user interfaces in a computerized manner for display of information on a display unit. A frequently used user interface is known as the "tab card", which is shown in FIG. 1. The tab card TC shown there has a display region C that corresponds to "card" and a number of flags T1, T2 and T3 on which it is indicated which information is presently rendered in the display region C. The individual flags T1, T2 and T3 can be activated to display the information associated with the flag in the region C, with the activation of a flag being made visually clear by the flag being optically emphasized or a dividing line between the flag and the region C by being removed, such that the impression is created that the tab card lies open to the corresponding flag. The flag T1 is activated in FIG. 1 since no dividing line is present between the flag T1 and the region C.

Information can be grouped into independent logic groups with tab cards, for example into the groups "books" or "films". A user can obtain access to the corresponding groups via the flags. Tab cards exhibit the disadvantage that the information to be grouped essentially has the same cardinality, i.e. the information all belongs to a uniform hierarchy level. Moreover, the information on the respective tab cards cannot be represented dependent on one another. Additionally, tab cards present no overview of the correlations between the individual items of information.

Information that is applicable for a number of respective file cards must be repeated again on every file card, such that the display area on the display screen is undesirably occupied by redundancies.

A further known concept for a user interface is "expandable blinds" or "disclosure triangles". Expandable blinds are used in order to offer detail views regarding superordinate information, with the superordinate information being presented in list form. FIG. 2 shows a user interface in the form of such an expandable blind. The user interface has a number of blinds B that each has a triangle having a vertex that is horizontally aligned. Superordinate information is displayed right next to these triangles, which is not shown in FIG. 2. These blinds can be expanded by activation of an individual blind B (in particular via clicking on a triangle by means of a mouse on the user interface) such that open blinds OB arise, of which two are shown in FIG. 2. The superordinate information of the folded blinds B is retained, but the corresponding triangle rotates 90° downward so that the vertex points downward. Detailed information regarding the corresponding superordinate information the blind is then found in the expanded region of the blind OB. The opened blind OB can be closed again by a corresponding click on its triangle.

With such expandable blinds a user initially obtains only an overview of the superordinate information given a list of the closed blinds. Detail information then becomes visible by the opening of the blinds. Expandable blinds are suitable for the presentation of two hierarchical information levels, namely brief information and detail information. Expandable blinds, however, are not suitable for the depiction of additional hierarchy levels or of a number of items of detailed information, since then the clarity of the presentation is limited. When the number of items of superordinate information in the list of the expandable blinds is very long, a large amount of space for the display of the superordinate information is also lost, and this space should more desirably be used to present detail information that is of particular interest for the user.

A further known user interface known is the presentation of information in a tree structure. A number of hierarchies of information are depicted in a tree structure. A tree structure is conventionally used in file administration systems of computers. One example is Windows Explorer® from the company Microsoft. There the existing space that is used for Explorer® is divided into two parts. The file tree is depicted in a left display region. The sub-structures of the file tree are opened via corresponding activation of the elements of the file tree by means of a mouse pointer. The files within an individually marked element of the tree structure are displayed in a right display region.

User interfaces in the form of a tree structure support the navigation of information with complex hierarchies. They do not serve to display detail information regarding superordinate information.

SUMMARY OF THE INVENTION

An object of the invention is to provide a method for computerized processing of digitized information for display on a display unit, that allows a number of items of detailed information regarding superordinate information is be displayed with good utilization of the display space that is present on the display screen.

This object is achieved in accordance with the invention by a method wherein digital information representing multiple items of first superordinate information and multiple items of second detailed information respectively associated with an item of superordinate information, are read from a memory that is remote from and physically unassociated with the display unit. For example, the memory can hereby be a central memory of a data administration system that is located on a central server and which can be accessed via various clients. It is also possible for the memory to be a local memory on a computer.

In the inventive method the read items of first and second information are processed such that the first information can be displayed in a first display region of the display unit and the second information can simultaneously be displayed in a second display region of the display unit, with a display of the information in one of the display regions causing no modification of the size of the other display region. In this manner the invention differs from the expandable blinds known from the prior art, in which no clearly defined display regions exist. In particular, in an expandable blind the corresponding list of the superordinate information enlarges given the display of detailed information. In contrast to this, according to the invention the size of the first and second display regions always remains the same, even given a change of the displayed information, such that a clear representation of the information is ensured.

In the inventive method the first and the second display regions interact (cooperate) such that the associated second information regarding a number of items of information displayed in the first display region can be displayed in the second display region. In this feature the invention differs from conventional user interfaces in tree structures because detail information can be inventively displayed for a number of superordinate information, in contrast to which only detail information regarding an individual element of the tree can be rendered in the prior art. In this manner a user can quickly receive an overview of a number of items of detailed information of various items of superordinate information that the user can then compare with one another.

In a preferred embodiment of the invention, for at least one part of the displayed first information, and in particular for every item of displayed first information, the first display region contains a respective selection element with which the respective item of first information can be selected on the display unit by a user, so the second information associated with the selected first information is displayed in the second display region. A flexible adaptation of the displayed second information dependent on the user is ensured in this manner. A further selection element can be advantageously provided with which all items of first information can be selected in the first display region, whereupon the items of second information associated with all items of first information are displayed in a second display region. In this manner a user can quickly procure an overview of the total quantity of the detailed second information by actuation of the further selection element.

In a preferred embodiment, the selection elements and/or the first selection element are check boxes which can be actuated with a pointer (for example the pointer of a computer mouse) on the display unit. Check boxes are sufficiently known from the prior art; upon activation of a check box a corresponding activation character (in particular in the form of a check) is rendered in a (usually) quadratic window.

In one embodiment of the invention, the first and/or second display region can be scrolled, such that the corresponding display region can always remain the same size even when the display region is not sufficient for the content to be displayed.

In a further embodiment of the inventive method, the first and/or the second display region can be varied in size. A user thus can adapt the display of the information dependent on the available space on the display unit. In a preferred version, the first and the second display regions form a common display field that is filled by the first and second display regions, and a variation of the size of one of the display regions causes a variation of the size of the other display region such that the display field is again filled with both display regions without the size of the display field being altered. The clarity of the display is ensured in this manner.

Moreover, in a further embodiment of the inventive method the total size of the display field can be altered, such that the amount of space to be used in total for the display field on the display means can be flexibly adjusted (set) by a user.

In a further embodiment of the invention, one or more activatable interaction elements are provided, the activation of which causes the size of the first and/or second display region to be altered. The interaction elements can be activated with a pointer on the display unit, with the presently activated interaction element being virtually emphasized. A user thus can change between views with different degrees of detail in a simple manner. First, second and third interaction elements can be provided. Upon activation of the first interaction element, only the first display region is displayed on the display unit. Upon activation of the second interaction element the first and second display regions are displayed with essentially the same size on the display unit. Upon activation of the third interaction element, only the second display region is displayed on the display unit. A simple selection between a pure view of the superordinate information, a pure detail view, and a mixed view is ensured in this manner.

In a further embodiment of the invention, the items of first and/or second information are also divided into groups, and activatable grouping elements, with which the information from the respective group can be displayed in the corresponding display region, being provided in the first and/or second display region. In this manner the information can be structured even further. Elements known from the prior art can be used as grouping elements, in particular the tab cards and/or expandable blinds discussed in the preceding. The activation elements can be activated with a pointer on the display unit, with the presently activated grouping element being visually emphasized. The emphasis can be, for example, an outlining of the activated element or a color variation relative to the other grouping elements.

The first and second display regions can be arranged in an arbitrary manner on the display screen. The first and second display regions can be positioned vertically one atop the other or horizontally next to one another.

In a preferred embodiment of the invention, a monitor (in particular a computer monitor) is used as a display unit in the implementation of the method.

In addition to the method described above, the invention also concerns a device for computerized processing of digital information for display on a display unit. The device includes a read unit with which digital information representing a number of items of superordinate information and a number of items of second, detailed information, respectively associated with an item of superordinate information can be read from a memory. The device also includes with which the read first and second information are processed to cause the first items of information to be displayed in a first display region of the display unit and the second items of information to be simultaneously be displayed in a second display region of the display unit, with display of the information in one of the display regions not causing a modification of the size of the other display region. The first and second display regions are designed such that the associated second items of information regarding a number of items of information displayed in the first display region can be displayed in the second display region.

The device is in particular designed such that each variant of the inventive method described above can be implemented.

BRIEF DESCRIPTION OF THE DRAWINGS

FIG. 3 through FIG. 5 respectively illustrate various views of the display of information on a display unit according to an embodiment of the invention.

DESCRIPTION OF THE PREFERRED EMBODIMENTS

Figure 1:
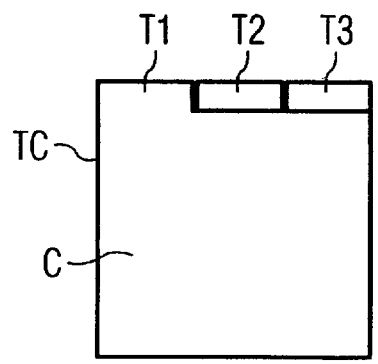
FIG. 1 and FIG. 2, as described above, respectively illustrate two variants of user interfaces according to the prior art.
Figure 2:
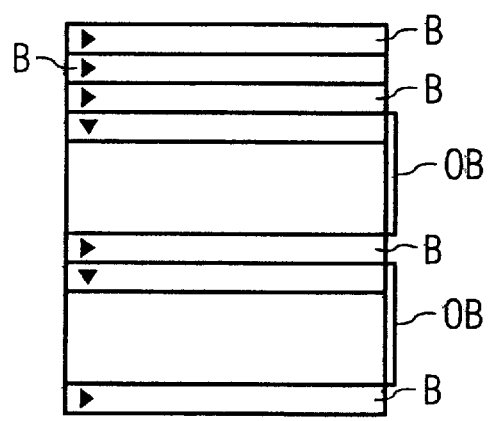

FIG. 1 and FIG. 2 show two types of user interfaces in the form of a tab card and in the form of expandable blinds, respectively. These user interfaces were explained in detail in the discussion of the prior art and therefore need not be described again at this point.

Figure 3:
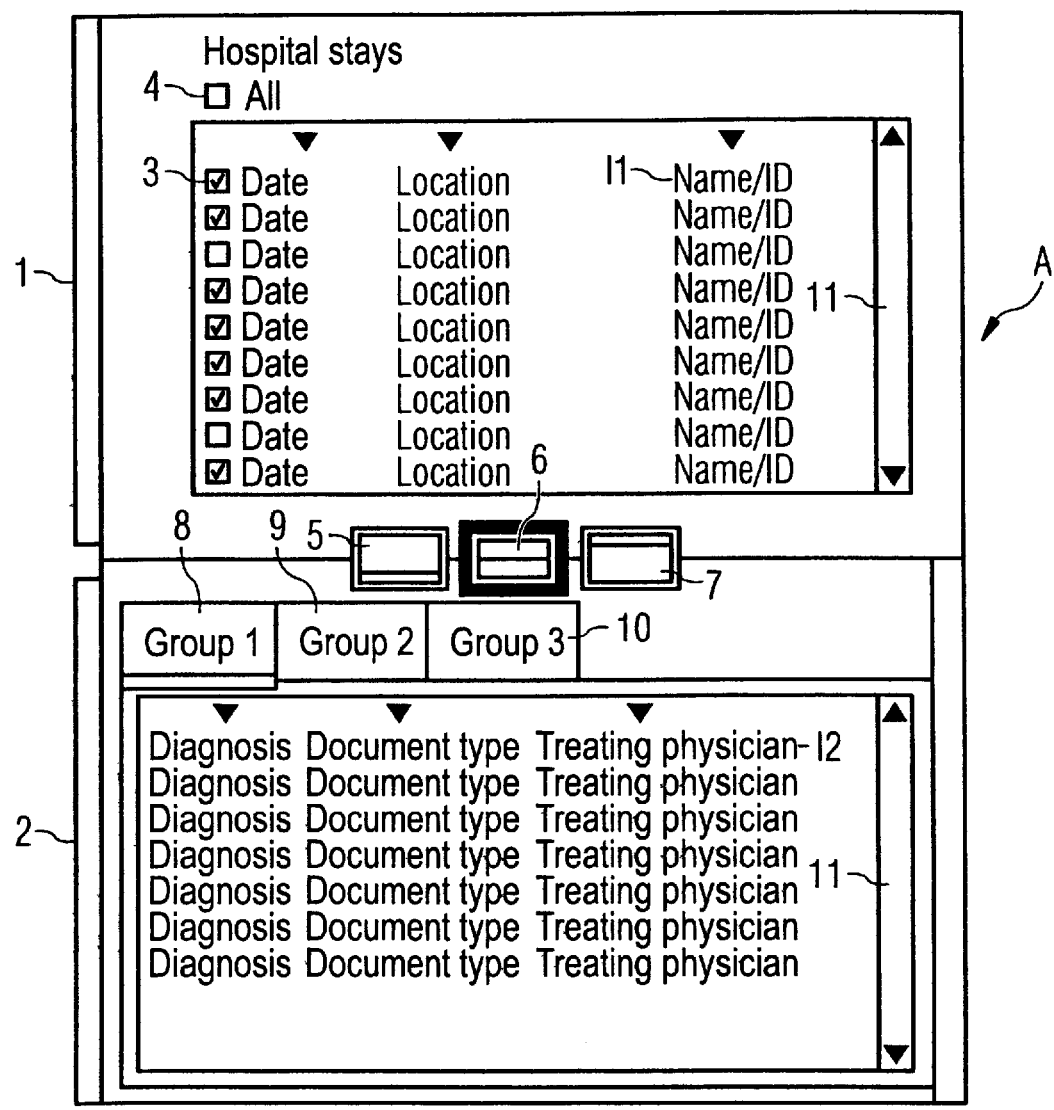

FIG. 3 shows a first view of displayed information on a display unit according to an embodiment of the inventive method. The information is shown in a display field A that is sub-divided into a first display region 1 and a second display region 2. Superordinate information is displayed in the first display region 1 and detail information regarding the corresponding superordinate information of the display region 1 is shown in the second display region 2. The displayed information in this example is information from a hospital administration system that was read from a memory remote from the display unit and not physically associated therewith, in particular from a central memory. The information of patients concerning their hospital stays is shown in FIG. 3. General items of first information regarding the hospital stays are found in the display region 1. The individual items of information are shown line-by-line, each line showing an item of superordinate information I1 regarding a hospital stay. For reasons of clarity, only the first line in the display field 1 is provided with the reference character I1 in FIG. 1. The date of the hospital stay as well as the location of the hospital (location) and the name of the patient (name/ID) are shown as individual items of information of each line.

Check boxes that can be checked by an operator (such as with a mouse pointer) are located at the start of each line of the information I1. For clarity, only the check box of the first line is thereby identified with the reference character 3. Depending on which check boxes 3 are checked, corresponding items of detailed second information I2 are shown in the display region 2 regarding the corresponding checked information I1. The detailed information is again grouped line-by-line. For reasons of clarity only the first line is provided with the reference character I2. The information includes information regarding the diagnosis, the document type in which the diagnosis is found and the treating physician. If applicable, an operator can also check a superordinate check box 4 in the display region 1, whereupon all check boxes 3 (and thus the detailed information I2 regarding all items of superordinate information I1) are shown in the display region 2. The use of the check box 4 has the advantage that an operator can achieve an overview about the detailed information without taking their superordinate information into account. For example, an operator can gain an overview of all cardiological diagnoses of the illness history.

The display field A in the embodiment of FIG. 3 is always filled with the first display region 1 and/or the second display region 2. The total size of the display field A can possibly be altered, for example by dragging the display field to make it larger or smaller by means of a pointer at the edge of the field. Moreover, the presentation of the display regions 1 and 2 within the display field A can be altered by interaction elements 5, 6 and 7. The interaction elements can be activated by an operator, such as with a pointer. In the view of FIG. 3 the middle interaction element 6 is activated, which is emphasized by this interaction element 6 exhibits a black border. Given the selection of this interaction element, the display field A is sub-divided into two equally large regions, with the display region 1 being shown in the upper region and the display region 2 being shown in the lower region. Only the first display region 1 is shown given activation of the interaction element 5, and only the second display region 2 in the display field A is shown upon activation of the interaction element 7.

In the embodiment of FIG. 3, further grouping elements in the form of tab cards with flags 8, 9 and 10 are also provided in the second display region 2. These tab cards again form groupings, namely the group 1, the group 2 and the group 3, into which the detailed information are divided. In the view of FIG. 3, the group 1 with the flag 8 is presently activated. The detailed information can be shown in a more structured manner by the use of further grouping elements. Instead of the use of tab cards, any other grouping elements can also be used, for example the expandable blinds discussed in the preceding.

Since a number of items of information that cannot all be shown at once on the display means may possibly be encompassed in the individual display regions 1 and 2, the display regions 1 and 2 also have scroll bars 11 with which a user can run through the content of the display regions.

Figure 4:
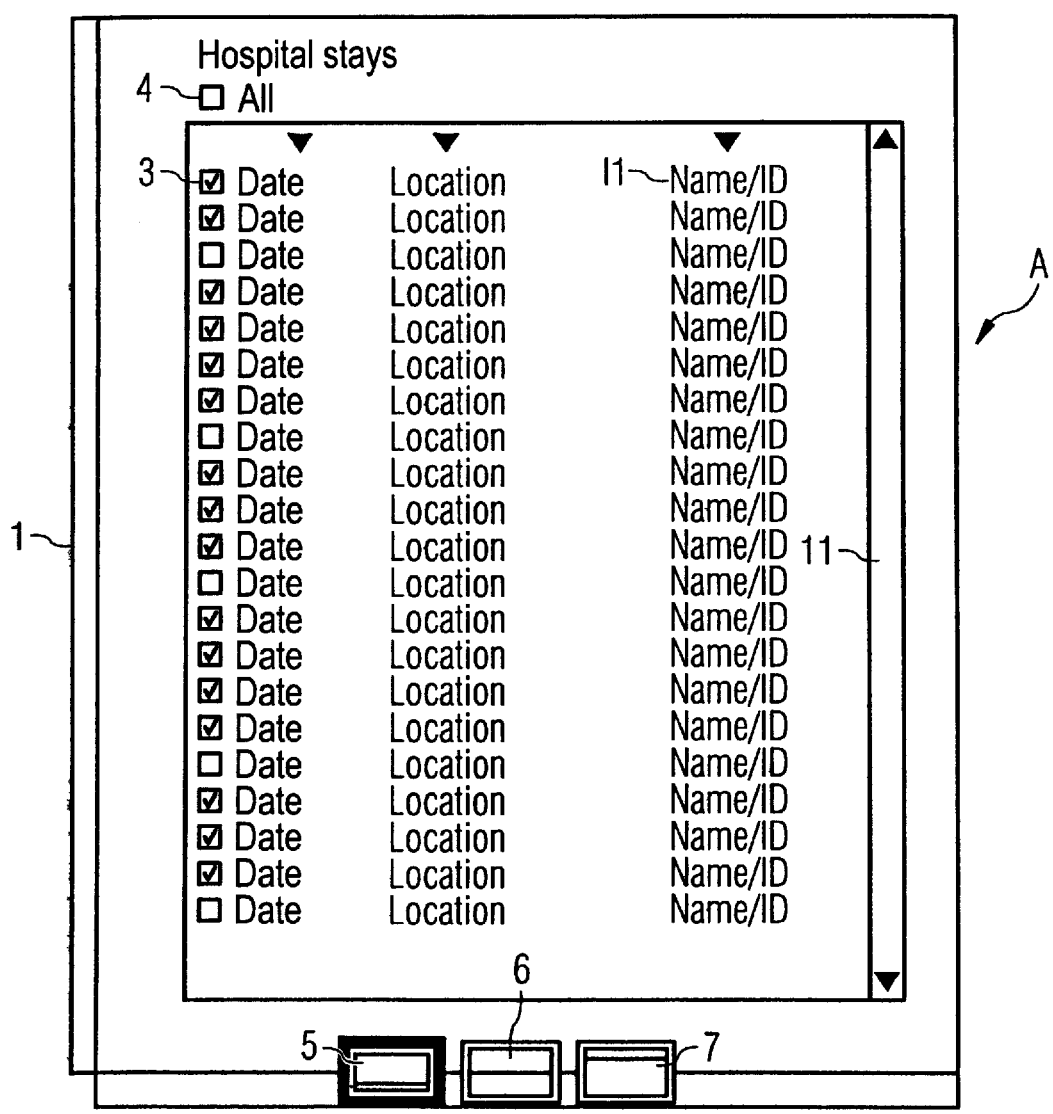

FIG. 4 and FIG. 5 show the same embodiment of the invention as FIG. 3, wherein the interaction element 5 has been activated in FIG. 4 so that exclusively the superordinate items of information of the display region 1 are shown in the display field A. In FIG. 5 the interaction element 7 has been activated so that now only the detailed information of the display region 2 is displayed in the display field A. By switching back and forth between the interaction elements 5 and 7, an operator can quickly gain an overview of the superordinate and the detailed information.

The embodiment of the invention described in the preceding enables flexible access to information. The user can achieve both a total overview of the present data sets and retrieve targeted details regarding individual data sets, or consider data in parallel. The spatial representation of the information hereby nevertheless remains constant. The orientation of the user is optimally supported.

The inventive solution is flexible enough to display any detail information. Different details can be displayed for data in the display region 1 than for data in the display region 2. The details of both regions are continually visible insofar as the operator has not decided (by the actuation of the interaction elements) to enlarge one of the two regions.

The number of the interaction elements for which detail information is displayed is arbitrarily variable by a user. The user can decide in favor of one element, multiple elements or all elements in order to compare the items of information that are relevant to him with one another directly, i.e. independent of the information hierarchy. The invention is particularly well suited to present a correlation between items of information. It takes into account the different cardinality of the information and the dependency of the individual information groups on one another. The information can be presented without redundancies. The solution thus enables a fast orientation and an intuitive navigation in the information. In accordance with the invention, a number of hierarchy planes can be integrated as needed, for example by the use of tab cards or expandable blinds. This is not possible with conventional solutions.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for computerized processing of digital information for display at a display screen in communication with a computerized processor, comprising the steps of:

via said processor, reading digital information from a memory, said digital information comprising a plurality of items of first information and a plurality of items of second information, said plurality of items of second information respectively defining categories of said items of first information;

in said processor, processing the items of first and second information read from said memory to cause said plurality of items of said first information to be displayed in a first display region of the display screen and to cause the plurality of items of second information to be simultaneously displayed in a second display region of the display screen, each of the first and second display regions having a respective size and the display of the respective information in one of said display regions causing no modification of the size of the other of said display regions; and at said display unit, allowing user-prompted interaction between said first and second display regions to allow multiple items of second information, respectively for multiple items of said first information displayed in said first display region, to be displayed in said second display region.

2. A method as claimed in claim 1 comprising, for at least one of the items of first information displayed in said first region, providing a selection element in said first display region allowing selection of said at least one of said items of first information by a user interacting with said display unit, and wherein, upon selection of said at least one of said at least one of said items of first information, said display unit automatically displays the second information associated therewith in said second display region.

3. A method as claimed in claim 2 comprising providing a further selection element in said first display region allowing selection of all of said items of first information by user interaction with said display unit, and wherein said display unit automatically causes all of said items of second information, respectively associated with all of said items of first information, to be displayed in said second display region.

4. A method as claimed in claim 3 wherein at least one of said selection element and said further selection element is a checkbox actuatable with a pointer on said display screen.

5. A method as claimed in claim 1 comprising allowing at least one of said first display region and said second display region to be scrolled by user interaction with said display unit.

6. A method as claimed in claim 1 comprising allowing at least one of said first display region and said second display region to be modified in size by user interaction with said display unit.

7. A method as claimed in claim 6 wherein said first and second display regions, in combination, form a display field in said display screen, which is completely filled by said first and second display regions, and comprising, upon modifying the size of one of said first and second display regions, automatically varying the size of the other of said first and second display regions so that said display field is still completely filled with both display regions without modifying a size of said display field.

8. A method as claimed in claim 7 comprising allowing the size of said display field in total to be modified by user interaction with said display unit.

9. A method as claimed in claim 8 comprising displaying a plurality of interaction elements that are activatable by user interaction with the display unit to respectively modify the size of said first display region, or said second display region, or said display field.

10. A method as claimed in claim 9 comprising presenting said interaction element at said display screen for activation by a pointer on said display screen and, upon activating one of said interaction elements with said pointer, visually emphasizing the activated interaction element on said display screen.

11. A method as claimed in claim 9 comprising displaying first, second and third activatable interaction elements at said display screen, and, upon activation of said first interaction element, exclusively displaying said first display region at said display screen, and upon activation of said second interaction element, displaying said first and second display regions with respectively the same size on said display screen, and upon actuation of said third interaction element, exclusively displaying said second display region on said display screen.

12. A method as claimed in claim 1 comprising dividing at least one of said items of first information and said items of second information into groups, and displaying activatable grouping elements at said display screen that, when activated, cause a group corresponding thereto to be displayed in one of said first display region or said second display region.

13. A method as claimed in claim 12 comprising displaying said grouping elements as tab cards or expandable blinds.

14. A method as claimed in claim 12 comprising allowing activation of said grouping elements with a pointer on said display screen and, upon activation of one of said grouping elements with said pointer, automatically visually emphasizing the activated grouping element.

15. A method as claimed in claim 1 comprising displaying said first and second display regions vertically above one another on said display screen.

16. A method as claimed in claim 1 comprising displaying said first and second display regions horizontally next to each other on said display screen.

17. An apparatus for computerized processing of digital information comprising:
a computerized processor in communication with a display screen;
said processor being configured to read digital information from a memory, said digital information comprising a plurality of items of first information and a plurality of items of second information, said plurality of items of second information respectively defining categories of said items of first information;
said processor being configured to process the items of first and second information read from said memory to cause said plurality of items of first information to be displayed in a first display region of the display screen and to cause the plurality of items of second information to be simultaneously displayed in a second display region of the display screen, each of the first and second display regions having a respective size and the display of the respective information in one of said display regions causing no modification of a size of the other of said display regions; and
a user interface at said display unit allowing user-prompted interaction between said first and second display regions to allow multiple items of second information, respectively for multiple items of said first information displayed in said first display region, to be displayed in said second display region.

\* \* \* \* \*